United States Patent
Schell et al.

(10) Patent No.: US 9,212,735 B2
(45) Date of Patent: Dec. 15, 2015

(54) ARRANGEMENT OF A TRANSMISSION AND OF AN ATTACHMENT MODULE

(75) Inventors: Oliver Schell, Ravensburg (DE); Rayk Gersten, Friedrichshafen (DE); Maik Kerkhoff, Oberteuringen (DE)

(73) Assignee: ZF Friedrichshafen, Friedrichshafen (DE)

( * ) Notice: Subject to any disclaimer, the term of this patent is extended or adjusted under 35 U.S.C. 154(b) by 179 days.

(21) Appl. No.: 13/980,329

(22) PCT Filed: Dec. 6, 2011

(86) PCT No.: PCT/EP2011/071833
§ 371 (c)(1),
(2), (4) Date: Jul. 18, 2013

(87) PCT Pub. No.: WO2012/097913
PCT Pub. Date: Jul. 26, 2012

(65) Prior Publication Data
US 2013/0292209 A1    Nov. 7, 2013

(30) Foreign Application Priority Data

Jan. 20, 2011    (DE) .......................... 10 2011 002 904

(51) Int. Cl.
*F16H 57/04*    (2010.01)
*F16H 57/02*    (2012.01)

(52) U.S. Cl.
CPC .......... *F16H 57/043* (2013.01); *F16H 57/0471* (2013.01); *F16H 57/0445* (2013.01); *F16H 57/0454* (2013.01); *F16H 2057/02013* (2013.01)

(58) Field of Classification Search
CPC .............. F16H 57/043; F16H 57/0431; F16H 57/0426; F16H 57/0471
USPC ......................................................... 184/6.12
See application file for complete search history.

(56) References Cited

U.S. PATENT DOCUMENTS 2,584,965 A * 2/1952 McFarland ....................... 477/60
3,080,774 A * 3/1963 Nickerson et al. ............. 475/143
(Continued)

FOREIGN PATENT DOCUMENTS

CN         1989368 A      6/2007
DE     198 55 970 A1      6/2000
(Continued)

OTHER PUBLICATIONS

German Search Report Corresponding to 10 2011 002 904.4 mailed Jun. 29, 2011.
(Continued)

*Primary Examiner* — William E Dondero
*Assistant Examiner* — Minh Truong
(74) *Attorney, Agent, or Firm* — Davis & Bujold, P.L.L.C.; Michael J. Bujold

(57) ABSTRACT

An arrangement of a transmission (1) and an attachment module (4), in which the transmission (1) has a driveshaft (3) with a central, first axial bore (12) for supplying lubricating oil and the attachment module (4) has a connecting shaft (5) mounted in the housing by at least one roller bearing (6). The driveshaft (3) and the connecting shaft (5) are connected to one another, in a rotationally fixed manner, by a splined connection (8). The supply of lubricating oil for the spline connection (8) and the at least one roller bearing (6) occurs by way of the central, first axial bore (12) of the driveshaft (3).

17 Claims, 1 Drawing Sheet

(56) References Cited

U.S. PATENT DOCUMENTS

| | | | | |
|---|---|---|---|---|
| 3,249,189 | A | * | 5/1966 | Schjolin et al. ............ 192/70.12 |
| 3,454,136 | A | * | 7/1969 | Stark ............................ 184/6.12 |
| 3,541,885 | A | * | 11/1970 | Burcz ............................... 74/720 |
| 3,637,049 | A | * | 1/1972 | Butterfield et al. .......... 184/6.12 |
| 3,834,248 | A | * | 9/1974 | Caliri ............................. 74/443 |
| 3,894,446 | A | * | 7/1975 | Snoy et al. ...................... 475/88 |
| 4,198,948 | A | * | 4/1980 | Conrad et al. ............ 123/196 R |
| 4,355,542 | A | | 10/1982 | Tsutsumi et al. |
| 4,567,784 | A | | 2/1986 | Hambric |
| 4,590,820 | A | | 5/1986 | Hambric |
| 4,669,999 | A | * | 6/1987 | Miller .............................. 464/10 |
| 4,693,353 | A | * | 9/1987 | Kobayashi et al. ......... 192/85.41 |
| 4,789,316 | A | * | 12/1988 | Gable .............................. 418/88 |
| 5,400,884 | A | * | 3/1995 | Matsuoka .................... 192/3.25 |
| 5,791,193 | A | * | 8/1998 | Uematsu et al. ................ 74/467 |
| 6,306,060 | B1 | * | 10/2001 | Dutson et al. ..................... 476/8 |
| 6,599,066 | B1 | * | 7/2003 | Koike et al. ................... 409/135 |
| 8,905,885 | B2 | * | 12/2014 | Yamamoto et al. ........... 475/159 |
| 8,960,029 | B2 | * | 2/2015 | Williamson ...................... 74/11 |
| 2003/0070877 | A1 | | 4/2003 | Min et al. |
| 2003/0121724 | A1 | * | 7/2003 | Hori et al. .................... 184/6.12 |
| 2003/0209012 | A1 | | 11/2003 | Hori et al. |
| 2004/0060774 | A1 | * | 4/2004 | Oshidari et al. ............. 184/6.12 |
| 2005/0139401 | A1 | | 6/2005 | Fujioka |
| 2005/0172740 | A1 | * | 8/2005 | Ebihara et al. .................. 74/15.4 |
| 2006/0207254 | A1 | * | 9/2006 | Labala .......................... 60/605.3 |
| 2008/0011263 | A1 | | 1/2008 | Klose |
| 2009/0293652 | A1 | * | 12/2009 | Williamson ................... 74/15.2 |

FOREIGN PATENT DOCUMENTS

| | | |
|---|---|---|
| EP | 1302701 A1 | 4/2003 |
| JP | 2006250238 A | 9/2006 |
| JP | 2007-166802 A | 6/2007 |

OTHER PUBLICATIONS

International Search Report Corresponding to PCT/EP2011/071833 mailed Mar. 13, 2012.

Written Opinion Corresponding to PCT/EP2011/071833 mailed Mar. 13, 2012.

Chinese Office Action issued in corresponding Chinese Application No. 201180065583.0 mailed Apr. 22, 2015.

* cited by examiner

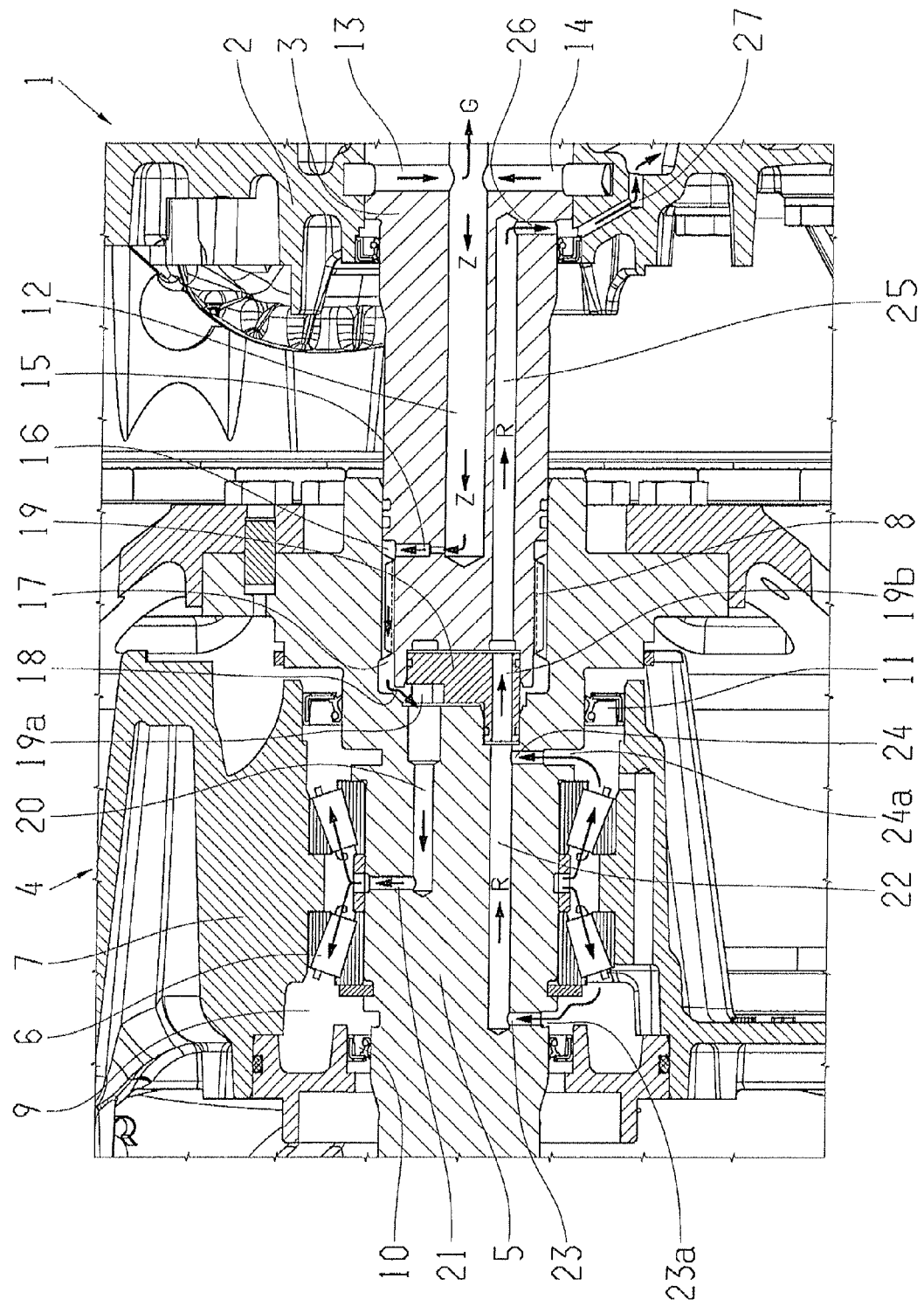

ARRANGEMENT OF A TRANSMISSION AND OF AN ATTACHMENT MODULE

This application is a National Stage completion of PCT/EP2011/071833 filed Dec. 6, 2011, which claims priority from German patent application serial no. 10 2011 002 904.4 filed Jan. 20, 2011.

FIELD OF THE INVENTION

The invention concerns an arrangement of a transmission and an attachment module.

BACKGROUND OF THE INVENTION

The problem addressed by the invention concerns the supply of oil to an attachment module that is to be connected to a basic transmission. The attachment module comprises at least one roller bearing that has to be lubricated and cooled, and other lubrication points which also need to be supplied with oil.

SUMMARY OF THE INVENTION

The purpose of the present invention is to ensure, in an arrangement of a transmission and an attachment module of the type mentioned above, that the attachment module is supplied with lubricant.

According to the invention, it is provided that the transmission is connected to the attachment module by means of a spline connection and the oil is supplied by way of a central axial bore in the driveshaft. Thus, the supply of oil to the attachment module is connected to the oil supply of the transmission and there is therefore no need for any additional oil supply of the attachment module's own. The supply of lubricant at the same time cools the at least one roller bearing of the attachment module.

In a preferred embodiment the lubricating oil supply comprises an oil inlet flow or oil feed via the spline connection as far as the at least one roller bearing, and an oil return flow from the roller bearing back into the driveshaft of the transmission. Thus, no additional oil lines are required since these are integrated in the driveshaft of the transmission and the connecting shaft to the attachment module.

According to a further preferred embodiment, a first radial bore branches off from the first, central axial bore, which distributes the lubricating oil ahead of the spline connection so that the drive teeth receive a sufficient supply of lubricating oil. The radial bore is preferably in the form of a stepped bore, so that an inflow throttling effect is produced in the oil feed.

In a further preferred embodiment, in the connecting shaft there is an eccentrically arranged axial bore and, branching off from this, a radial bore that leads to the at least one roller bearing, in particular to a conical roller bearing. In this case too the radial bore is preferably made as a stepped bore in order to produce additional throttling of the oil feed.

In another preferred embodiment the at least one roller bearing, preferably a conical roller bearing, is arranged in a pressure space sealed off from the outside, i.e. from the atmosphere, by shaft sealing elements. Preferably radial shaft sealing rings are used. The sealing pressure of the shaft seal elements determines the maximum oil pressure in the pressure space—otherwise, the oil would escape freely to the outside. Accordingly, the oil pressure present on the input side in the central, first axial bore is throttled in steps. By virtue of the cross-sections of the feed bores the flow rate of the lubricating oil is adjusted so that sufficient cooling of the roller bearing takes place.

According to a further preferred embodiment the oil return flow passes through a third axial bore arranged eccentrically in the connecting shaft, which is in fluid-flow connection with two short radial return bores. The return bores have a relatively large cross-section and a relatively small radial extension, so that the pressures produced by the rotating oil columns in the return remain as low as possible. Advantageously, the inlet areas of the radial return bores can be expanded, for example in the from of ring grooves or reflected shapes. This reduces the oil pressure to be overcome for the return flow.

In a further preferred embodiment the radial extensions of the radial bores of the connecting shaft are substantially of the same length. In this way the difference between the pressures produced by the rotating oil columns in the radial bores on the inlet and on the outlet side can be kept as small as possible.

In a further embodiment the second and the third axial bores in the connecting shaft are formed in the outer radial area. This allows the radial bores connected to them to be made as short as possible, so that the pressure acting on the shaft sealing elements does not become too large.

In another preferred embodiment a fourth axial bore is arranged in the driveshaft, which is positioned in alignment with the third axial bore in the connecting shaft. This gives the advantage of a small pressure drop in the return flow.

According to a further preferred embodiment, a separation point is provided between the end of the driveshaft and the connecting shaft, in the area of which an oil transfer element is inset into the end face of the driveshaft and sealed. By means of this oil transfer element, the incoming and outgoing oil streams are separated and guided from the driveshaft into the connecting shaft and conversely, from the connecting shaft into the driveshaft. For this purpose the oil transfer element has two transfer points, namely on the one hand an aperture for the oil inflow and on the other hand an aperture for the oil return flow, for example a through-going bore that forms a straight and therefore low-resistance connection between the axial bores in the connecting shaft and the driveshaft. This keeps the pressure drop in the return flow relatively small.

BRIEF DESCRIPTION OF THE DRAWING

An example embodiment of the invention is illustrated in the sole drawing which shows an embodiment of a transmission arrangement and an attachment module and which will be described in greater detail below.

DETAILED DESCRIPTION OF THE PREFERRED EMBODIMENTS

The single FIGURE shows part of a basic transmission 1 with a driveshaft 3 mounted in a housing 2. An attachment module 4 comprises a connecting shaft 5 mounted in a module housing 7 by means of a roller bearing arrangement consisting of two conical roller bearings 6. The connecting shaft 5 is connected in a rotationally fixed manner to the driveshaft 3 of the basic transmission 1 by means of a spline connection 8 formed by driving spline teeth. The conical roller bearings 6 are arranged in a pressure space 9 sealed from the outside by shaft sealing elements in the form of radial shaft sealing rings 10, 11.

The attachment module 4 is supplied with lubricating oil from the lubricating oil system of the basic transmission 1, wherein the lubricating oil supply is provided by an oil feed flow coming from the basic transmission 1 and an oil return flow leading back from the attachment module 4 to the basic transmission 1. The driveshaft 3 of the basic transmission 1 has a centrally arranged axial bore 12, also referred to in what follows as the first axial bore 12. The first axial bore 12 is supplied with pressure oil from a lubricating oil source (not shown) by way of two radial inlet bores 13, 14. Via these two inlet bores 13, 14, on the one hand the basic transmission 1 is supplied with lubricating oil by a flow, as represented by arrow G, and on the other hand the attachment module 4 is supplied with lubricating oil by a flow, as represented arrow Z (feed) in the first axial bore 12. In the flow direction according to the arrow Z, a first radial bore 15 is arranged ahead of the splines 8, which connects the first axial bore 12 to an annular gap 16 located before the splines 8. This first radial bore 15 is made as a stepped bore in order to produce a throttle effect. In the direction of flow behind the splines 8 is arranged another, wider annular gap 17, into which the oil emerging from the spline joint 8 is distributed. The annular gap 17 merges at its end into a separation point 18 located between the end faces of the driveshaft 3 and the connecting shaft 5. In the area of the separation point 18 is arranged an oil transfer element 19, which is inset into a stepped bore formed in the end of the driveshaft 3. In the case of a first axial bore 12 (not shown here) as far as the oil transfer element 19, the oil transfer element 19 has an additional sealing function of the first axial bore 12 relative to the further axial bores 20, 22 and 25. The oil transfer element 19 has an opening 19a shown in the drawing at the top for the oil inflow and a through-bore 19b shown in the drawing at the bottom for the oil return flow. The circumference of the oil transfer element 19 is sealed relative to the driveshaft and the connecting shaft 3, 5, for example by means of O-rings, and can have a slight axial play. In the connecting shaft 5 is formed a second axial bore 20 positioned eccentrically relative to the central axis, which is in fluid-flow connection with the opening 19a and the wider annular gap 17. From the end of the second axial bore 20 there branches off a second radial bore 21, which leads to the area between the conical roller bearings 6. Like the first radial bore 15, the second radial bore 21 is made as a stepped bore so as to bring about a further throttle action. The second axial bore 20 too can be stepped in order to produce a corresponding throttling action. In the connecting shaft 5 there is formed eccentrically relative to the center-line another axial bore 22 indicated by a flow arrow R (return), also referred to in what follows as the third axial bore 22. This third axial bore 22 is connected to the pressure space 9 by two, namely a third and a fourth radial bores 23, 24, which are positioned close to the conical roller bearings 6. The third and fourth radial bores 23, 24 form return-flow bores and have a widened inlet cross-section in the form of annular grooves 23a, 24a so that relatively short rotating oil columns are formed. In the driveshaft 3 is formed another axial bore 25 again eccentrically relative to the center-line, which is also called the fourth axial bore 25 in what follows, and which is positioned in alignment with the third axial bore 22 and the through-going bore 19b in the oil transfer element 19. By forming an annular perforation in the stepped bore arranged at the end of the driveshaft 3, which is connected to the fourth axial bore 25, a reliable transfer of the oil from the oil transfer element 19 to the fourth axial bore 25 is ensured. At its end the fourth axial bore 25 merges into a fifth radial bore 26 which leads to an oil outlet 27. The oil feed (flow arrow Z) thus passes through the first axial bore 12, the first radial bore 15, the area of the splines 8, the second axial bore 20 and the second radial bore 21, which leads into the area between the conical roller bearings 6. From there the oil is distributed by way of the conical roller bearings 6 to the pressure space 9 which is sealed relative to the outside by the two radial shaft sealing rings 10, 11. The maximum oil pressure that can occur in the pressure space 9 is determined by the sealing pressure of the radial shaft sealing rings 10, 11. Thus, in the oil feed there takes place a step-wise throttling of the oil pressure via the two radial stepped bores 15, 21. The oil return (flow arrow R) from the pressure space 9 passes through the third and fourth radial bores 23, 24, the third axial bore 22, the fourth axial bore 25 and the fifth radial bore 26. Compared with the inflow the pressure drop in the return flow is relatively small, which is achieved by virtue of the short radial bores 23, 24 and the through-going axial bores 22, 19b and 25. The radial outflow bore 26, in contrast, is made relatively long so as to produce a suction effect because of the enlarged radial extent of the rotating oil columns, in order to draw off the lubricating oil.

By virtue of the arrangement according to the invention the manufacturing tolerances need not be so close. Thus, for example, there is no need for special angular orientations of the spline profiles relative to the oil bores. Furthermore, assembly is facilitated since the oil transfer element 19 and the shafts 3, 5 do not have to be rotationally aligned.

INDEXES

1 Basic transmission
2 Transmission housing
3 Driveshaft
4 Attachment module
5 Connecting shaft
6 Roller bearings
7 Module housing
8 Splined connection
9 Pressure space
10 Shaft sealing ring
11 Shaft sealing ring
12 First axial bore (central)
13 Inlet bore
14 Inlet bore
15 First radial bore
16 Annular gap
17 Annular gap
18 Separation point
19 Oil transfer element
19a Opening
19b Through-going bore
20 Second axial bore
21 Second radial bore
22 Third axial bore
23 Third radial bore
23a Annular groove
24 Fourth radial bore
24a Annular groove
25 Fourth axial bore
26 Fifth radial bore
27 Oil outlet
Z Flow arrow (inflow)
R Floe arrow (outflow)

The invention claimed is:

1. An arrangement of a transmission (1) and an attachment module (4);
   wherein the transmission (1) has a driveshaft (3) with a central, first axial bore (12) for supplying lubricating oil, the central first axial bore is a blind bore which has an axially open end and an axially closed end, and the driveshaft (3) has a first radial bore (15) which communicates with the central first axial bore (12);

the attachment module (4) has a connecting shaft (5) mounted in a housing by at least one roller bearing (6);

the driveshaft (3) and the connecting shaft (5) are connected to one another, in a rotationally fixed manner, by a splined connection (8) such that the closed end of the central first axial bore of the driveshaft (3) is adjacent the connecting shaft (5) and the open end is remote from the connecting shaft (5);

a lubricating oil supply flows, via the central first axial bore (12) of the driveshaft (3), to the spline connection (8) and the at least one roller bearing (6);

a separation point (18), in which oil transfers between the driveshaft (3) and the connecting shaft (5), is arranged between the driveshaft (3) and the connecting shaft (5), and the lubricating oil supply flows from the central first axial bore (12) of the driveshaft through the spline connection to the separation point (18); and an oil transfer element (19) is inset into an end of the driveshaft (3) and has a first transfer opening through which an oil inflow, leaving the spline collection, passes to the connecting shaft, and a second transfer opening through which an oil outflow passes, the oil transfer element is arranged in an area of the separation point (18).

2. The arrangement according to claim 1, wherein the second transfer opening, for an oil return flow, is in a form of an eccentrically arranged, axially through-going bore (19b), which connects a third axial bore in the connecting shaft and a fourth axial bore in the driveshaft of the oil return flow.

3. An arrangement of a transmission (1) and an attachment module (4), wherein the transmission (1) has a driveshaft (3) with a central, first axial bore (12) through which a lubricating oil flows toward the attachment module, the attachment module (4) has a connecting shaft (5) that is rotatably supported within a housing by at least one roller bearing (6), the driveshaft (3) and the connecting shaft (5) are connected to one another, in a rotationally fixed manner, by a spline connection (8), the spline connection (8) and the at least one roller bearing (6) are both supplied with the lubricating oil that flows through the central first axial bore (12) of the driveshaft (3), and the driveshaft comprises a first radial bore which communicates with the first axial bore and directs the flow of lubricating oil from the first axial bore to the spline connection located between the driveshaft and the connecting shaft, the connecting shaft comprises second and third eccentric axial bores and second and third radial bores, the second axial bore directs the flow of lubricating oil axially from the spline connection to the second radial bore which directs the flow of lubricating oil radially outward from the second axial bore to the at least one roller bearing, the third radial bore directs the flow of lubricating oil radially inward to the third axial bore, the third axial bore directs the flow of lubricating oil axially toward the driveshaft to a fourth axial bore that is eccentrically located within the driveshaft and which directs the flow of lubricating oil axially away from the connecting shaft.

4. An arrangement of a transmission (1) and an attachment module (4);

wherein the transmission (1) has a driveshaft (3) with a central, first axial bore (12) for supplying lubricating oil, the central first axial bore is a blind bore which has an axially open end and an axially closed end, and the driveshaft (3) has a first radial bore (15) which communicates with the central first axial bore (12);

the attachment module (4) has a connecting shaft (5) mounted in a housing by at least one roller bearing (6);

the driveshaft (3) and the connecting shaft (5) are connected to one another in a rotationally fixed manner by a splined connection (8) such that the closed end of the central first axial bore of the driveshaft (3) is adjacent the connecting shaft (5) and the open end is remote from the connecting shaft (5);

a lubricating oil supply flows, via the central first axial bore (12) of the driveshaft (3), to the at least one roller bearing (6); and the lubricating oil supply comprises an oil feed flow (12, 15, 20, 21) which flows by way of the splined connection (8) to the at least one roller bearing (6) and an oil return flow (23, 24, 22, 25, 26) that flows from the at least one roller bearing (6) into a further axial bore within the driveshaft (3).

5. The arrangement according to claim 4, wherein the oil feed flow to the spline connection (8) passes via the first radial bore (15) that branches off from the first axial bore (12) in the drive shaft.

6. The arrangement according to claim 5, wherein the first radial bore (15) in the driveshaft is a stepped bore which produces a throttle action.

7. The arrangement according to claim 4, wherein the oil supply passes through a second axial bore (20) that is positioned eccentrically in the connecting shaft (5) and through a second radial bore (21), in the connecting shaft that branches off from the second axial bore (20), into an area of the at least one roller bearing (6).

8. The arrangement according to claim 7, wherein at least one of the second axial bore (20) and the second radial bore (21) is a stepped bore which produces a throttle action.

9. The arrangement according to claim 7, wherein the oil return flow passes through a third axial bore (22) that is positioned eccentrically in the connection shaft (5) and directs the oil return flow through the connecting shaft in an axial direction opposite to a direction by which the oil supply passes through the second axial bore in the connecting shaft.

10. The arrangement according to claim 9, wherein the at least one roller bearing (6) is located in pressure space (9) which is sealed, relative to an outside, by shaft sealing elements (10, 11).

11. The arrangement according to claim 10, wherein the pressure space (9) is in fluid-flow connection with the third axial bore (22) by way of at least one third radial bore (23, 24) in the connecting shaft (5).

12. The arrangement according to claim 11, wherein the radial extensions of the second and the third radial bores (21, 23, 24), in the connecting shaft (5), are substantially of equal length.

13. The arrangement according to claim 11, wherein the second axial bore (20) and the third axial bore (22) are formed in an outer radial area of the connecting shaft (5).

14. The arrangement according to claim 4, wherein the further axial bore in the driveshaft, through which the oil return flow passes through, is a fourth axial bore (25) which is positioned eccentrically within the driveshaft (3).

15. The arrangement according to claim 14, wherein a fifth radial bore (26), which leads to an oil outlet (27), is formed, in relation to the oil return flow, at a downstream end of the fourth axial bore (25).

16. The arrangement according to claim 4, wherein the spline connection (8) is in the form of either driving spline profiles or driving teeth.

17. The arrangement according to claim 4, wherein a separation point (18), in which oil transfers between the driveshaft (3) and the connecting shaft (5), is arranged between the driveshaft (3) and the connecting shaft (5), and the lubricating oil supply is conducted from the central first axial bore of the driveshaft through the spline connection to the separation point.

\* \* \* \* \*